United States Patent
Frank

(10) Patent No.: US 10,474,554 B2
(45) Date of Patent: Nov. 12, 2019

(54) IMMUTABLE FILE STORAGE

(71) Applicant: VMware, Inc., Palo Alto, CA (US)

(72) Inventor: Alex Frank, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 235 days.

(21) Appl. No.: 15/356,102

(22) Filed: Nov. 18, 2016

(65) Prior Publication Data

US 2018/0144125 A1    May 24, 2018

(51) Int. Cl.
    *G06F 21/64*    (2013.01)
    *G06F 21/60*    (2013.01)
    *G06F 21/00*    (2013.01)
    *G06F 11/34*    (2006.01)
    *G06F 11/30*    (2006.01)

(52) U.S. Cl.
    CPC ...... *G06F 11/3495* (2013.01); *G06F 11/3006* (2013.01); *G06F 11/3476* (2013.01); *G06F 21/64* (2013.01); *G06F 2221/2101* (2013.01)

(58) Field of Classification Search
None
See application file for complete search history.

(56) References Cited

U.S. PATENT DOCUMENTS

| | | | | |
|---|---|---|---|---|
| 5,758,343 | A * | 5/1998 | Vigil | G06F 17/30067 |
| 7,707,642 | B1 | 4/2010 | Herbach et al. | |
| 10,015,015 | B1 * | 7/2018 | Lazar | H04L 9/3247 |
| 2004/0064692 | A1 | 4/2004 | Kahn et al. | |
| 2005/0097441 | A1 | 5/2005 | Herbach et al. | |
| 2006/0271395 | A1 * | 11/2006 | Harris | G06F 9/52 718/1 |
| 2008/0098107 | A1 | 4/2008 | Jones et al. | |
| 2010/0082984 | A1 | 4/2010 | Ellison et al. | |
| 2015/0082399 | A1 * | 3/2015 | Wu | G06F 21/6209 726/6 |
| 2016/0248642 | A1 * | 8/2016 | Rajasekar | G06F 11/3476 |
| 2016/0366209 | A1 * | 12/2016 | Netto | H04L 67/104 |
| 2017/0060936 | A1 * | 3/2017 | Gammans | G06F 17/30176 |

OTHER PUBLICATIONS

Schneier, B., & Kelsey, J. (1999). Secure audit logs to support computer forensics. ACM Transactions on Information and System Security (TISSEC), 2(2), 159-176. (Year: 1999).*

(Continued)

*Primary Examiner* — Alexander Lagor

(57) ABSTRACT

The present disclosure is related to devices and systems for immutable file storage. An example device can include instructions to hash a log file received from a log source to produce a hash value, store the hash value and information describing the log file, communicate the hash value and the information to a third party service, wherein the third party service maintains the communicated hash value and the communicated information such that the communicated hash value and the communicated information are immutable, access the communicated hash value and the communicated information, and compare the stored hash value and the stored information with the communicated hash value and the communicated information to determine whether the log file is unmodified.

16 Claims, 4 Drawing Sheets

(56) References Cited

OTHER PUBLICATIONS

Holt, J. E. (Jan. 2006). Logcrypt: forward security and public verification for secure audit logs. In ACM International Conference Proceeding Series (vol. 167, pp. 203-211). (Year: 2006).*

Chong, C. N., Peng, Z., & Hartel, P. H. (May 2003). Secure audit logging with tamper-resistant hardware. In IFIP International Information Security Conference (pp. 73-84). Springer, Boston, MA. (Year: 2003).*

Accorsi, R. (2013). A secure log architecture to support remote auditing. Mathematical and Computer Modelling, 57(7-8), 1578-1591. (Year: 2013).*

* cited by examiner ns herein, embodiments of the present disclosure can provide this immutabil-

IMMUTABLE FILE STORAGE

BACKGROUND

A log file can record events that occur in a computing environment. An attacker who attacks an aspect of a computing environment may leave evidence of that attack in associated log files. Because forensic examination of an attack may involve reviewing log file(s), an attacker may attempt to "cover their tracks" by modifying those log file(s).

DETAILED DESCRIPTION

Figure 1:
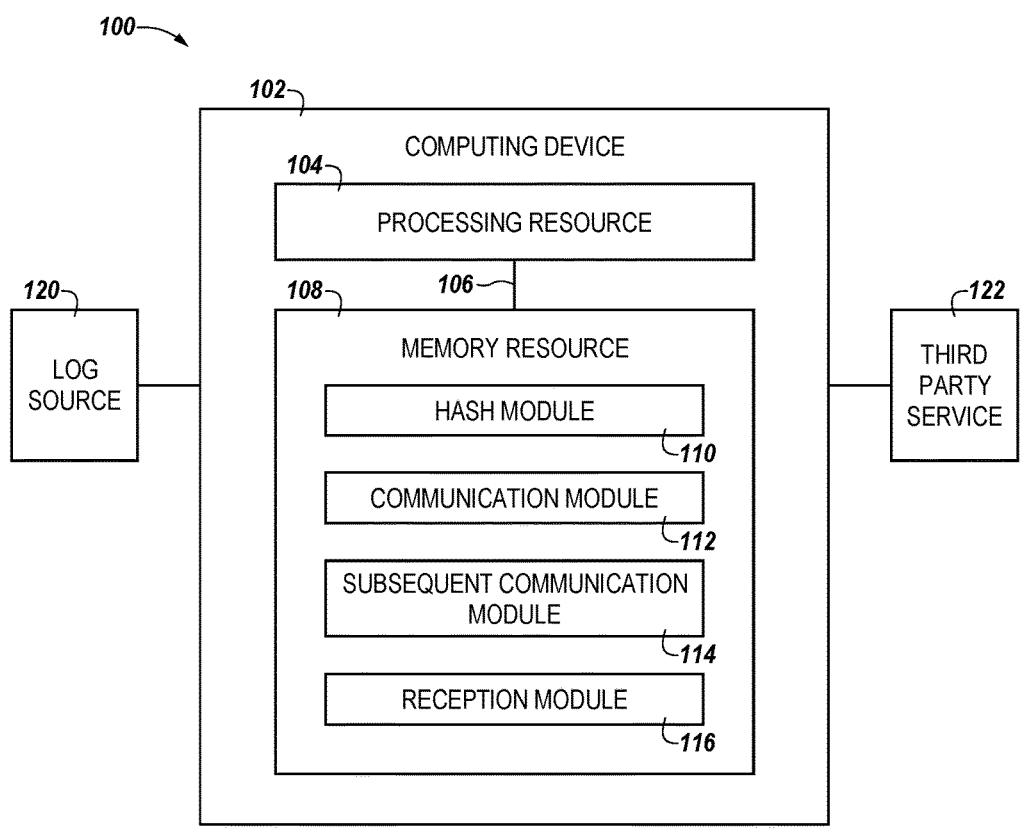
FIG. 1 is a diagram of a system for immutable file storage according to the present disclosure.

If an attacker or adversary attacks an aspect of a computing environment, log files (e.g., audit logs) may be used to forensically determine who the adversary was, what the adversary attacked, and how that attack was carried out, among other information. However, a skilled adversary may attempt to modify a log file retrospectively in order to conceal the attack.

In order to make such files immutable (e.g., unable to be changed) and thus resistant to attacker modification and successful concealment, some approaches employ special, dedicated hardware to store log files. This hardware can be both expensive to purchase and to install. Moreover, scalability shortcomings associated with such solutions can become especially problematic in large datacenters and/or in cloud computing environments, for instance. Other approaches using more traditional means of storage (e.g., CD, DVD, magnetic tape, etc.) may not scale well, may be slow, and may not be available on demand.

Aside from the concerns of information security, immutability and/or assured authenticity of log files may be a requirement in some cases. For instance, government regulation in the European Union may require agencies and/or companies to ensure that their files are immutable. Embodiments of the present disclosure can provide this immutability. Further, embodiments of the present disclosure can provide immutability in a scalable, reliable, and cost-effective manner.

It is noted that while the example of log files is discussed herein, embodiments of the present disclosure are not so limited. Immutability in accordance with embodiments herein can be provided for other files. For example, immutability can be provided for time-sequenced data, such as lab results, transcripts of court hearings, published articles and/or pages, etc.

A log file can be received from a log source. A log source refers to a source of one or more logs (e.g., event logs). It is to be understood that reference to "logs" herein is illustrative and other data can be received in addition to, or in lieu of, logs. In general, a log source can refer to any entity capable of generating logs. For instance, a log source can be a server (e.g., a physical server), a virtual computing instance, a host, a network device, a desktop computing device, an event channel, a log aggregator, a news agency server (e.g., curating stories received from multiple parties), etc. A log file is a log or a discreet portion of a log. In some embodiments, a log file can be a portion of a log defined by a first time instance and a second time instance.

In accordance with the present disclosure, a log file from a log source can be hashed to produce a hash value. The hash value can be stored along with information describing the log file (sometimes referred to herein as "metadata"). Additionally, the hash value and the metadata (sometimes collectively referred to herein as a "tuple") can be communicated to a trusted entity providing immutability and/or authenticity assurance of that tuple. In some embodiments, that entity can be a third party service, for instance, which can immutably store the tuple. When the log files are later audited for their integrity, the tuple can be re-determined (e.g., recomputed) and compared with the immutably-stored tuple. If there is a difference, the log file may likely have been tampered with.

In some embodiments, immutable storage can be provided by a secure cryptoprocessor in addition to, or in lieu of, a third party service. In such embodiments, the cryptoprocessor can process (e.g., seal, sign, encrypt, sample, etc.) the hash value and metadata such that it is protected from modification. A secure cryptoprocessor, as referred to herein, is a trusted hardware device that provides cryptographic functionalities. For example, a secure cryptoprocessor can refer to a trusted platform module (TPM), smart chip, and/or smartcard. The secure cryptoprocessor may be simply referred to herein as a controller.

For instance, many commercially available motherboards have a TPM already installed thereon. Embodiments of the present disclosure can therefore utilize existing hardware without requiring expensive and/or additional devices to be installed or used. Computing devices have already demonstrated the ability to interact with TPMs, and TPMs have already demonstrated their utility in areas such as authentication of hardware devices. Embodiments herein can take advantage of existing devices and streamline their implementation.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 220 in FIG. 2. A group or plurality of similar elements or components may generally be referred to herein with a single element number. For example a plurality of reference elements 442-1, 442-2, . . . , 442-N may be referred to generally as 442. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of a system 100 for immutable file storage according to the present disclosure. The system 100 can include a computing device 102 in communication with a log source 120. In some embodiments, the log source 120 can be a server, such as a file server, print server, communication server (such as email, remote access, firewall, etc.), application server, database server, web server, open source server, and others. The log source 120 can be a virtual computing instance, a host, a network device, a desktop computing device, an event channel, a log aggregator, etc. Embodiments herein are not intended to limit the log source 120 to a particular type and/or functionality.

The log source 120 can record a log of activities that occurs thereon. Logs can be recorded in real time, for instance. In some embodiments, logs can detail log source interaction with a client, for instance. In some embodiments, logs can track aspects of a number of applications and/or programs. In some embodiments, logs can track physical and/or virtual hardware usage. The logs can be communicated from the log source 120 to the computing device 102 as log files. In some embodiments, the log files may be first communicated to a log aggregator and then communicated from the log aggregator to the computing device 102.

The system 100 can include a third party service 122. The third party service 122 can be accessed by the computing device 102 via a network connection, for instance. In some embodiments, the third party service 122 can be accessible via the Internet. The third party service 122 can be accessible by the computing device 102 to write data and/or read data, but not to modify and/or delete data. The third party service 122 can be a trusted entity, such as a trusted directory service, and can be administered by a party different than a party managing the computing device 102. The third party service 122 can be in a different security domain than the computing device 102. Information sent by the computing device 102 to the third party service 122 may not be modifiable by the computing device 102 (e.g., by a user of the computing device 102). Information received by the third party service 122 can be immutable, for instance.

The computing device 102 can utilize software, hardware, firmware, and/or logic to perform a number of functions. The computing device 102 can be a combination of hardware and program instructions configured to perform a number of functions (e.g., actions). The hardware, for example, can include a number of processing resources 104 and a number of memory resources 108, such as a machine-readable medium (MRM) or other memory resources 108. The memory resources 108 can be internal and/or external to the computing device 102 (e.g., the computing device 102 can include internal memory resources and have access to external memory resources). In some embodiments, the computing device 102 can be a management server, for example, analogous to the management server 448, discussed below in connection with FIG. 4. The program instructions (e.g., machine-readable instructions (MM)) can include instructions stored on the MRM to implement a particular function (e.g., an action such as comparing values). The set of MRI can be executable by one or more of the processing resources 104. The memory resources 108 can be coupled to the computing device 102 in a wired and/or wireless manner. For example, the memory resources 108 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

The memory resources 108 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 104 can be coupled to the memory resources 108 via a communication path 106. The communication path 106 can be local or remote to the computing device 102. Examples of a local communication path 106 can include an electronic bus internal to a machine, where the memory resources 108 are in communication with the processing resources 104 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 106 can be such that the memory resources 108 are remote from the processing resources 104, such as in a network connection between the memory resources 108 and the processing resources 104. That is, the communication path 106 can be a network connection. Examples of such a network connection can include a local area network (LAN), wide area network (WAN), personal area network (PAN), and the Internet, among others.

As shown in FIG. 1, the MRI stored in the memory resources 108 can be segmented into a number of modules 110, 112, 114, 116 that, when executed by the processing resources 104, can perform a number of functions. As used herein a module includes a set of instructions executed to perform a particular task or action. The number of modules 110, 112, 114, 116, can be sub-modules of other modules. For example, the subsequent communication module 114 can be a sub-module of the communication module 112 and/or can be contained within a single module. Furthermore, the number of modules 110, 112, 114, 116, can comprise individual modules separate and distinct from one another. Examples are not limited to the specific modules 110, 112, 114, 116, illustrated in FIG. 1.

Figure 2:
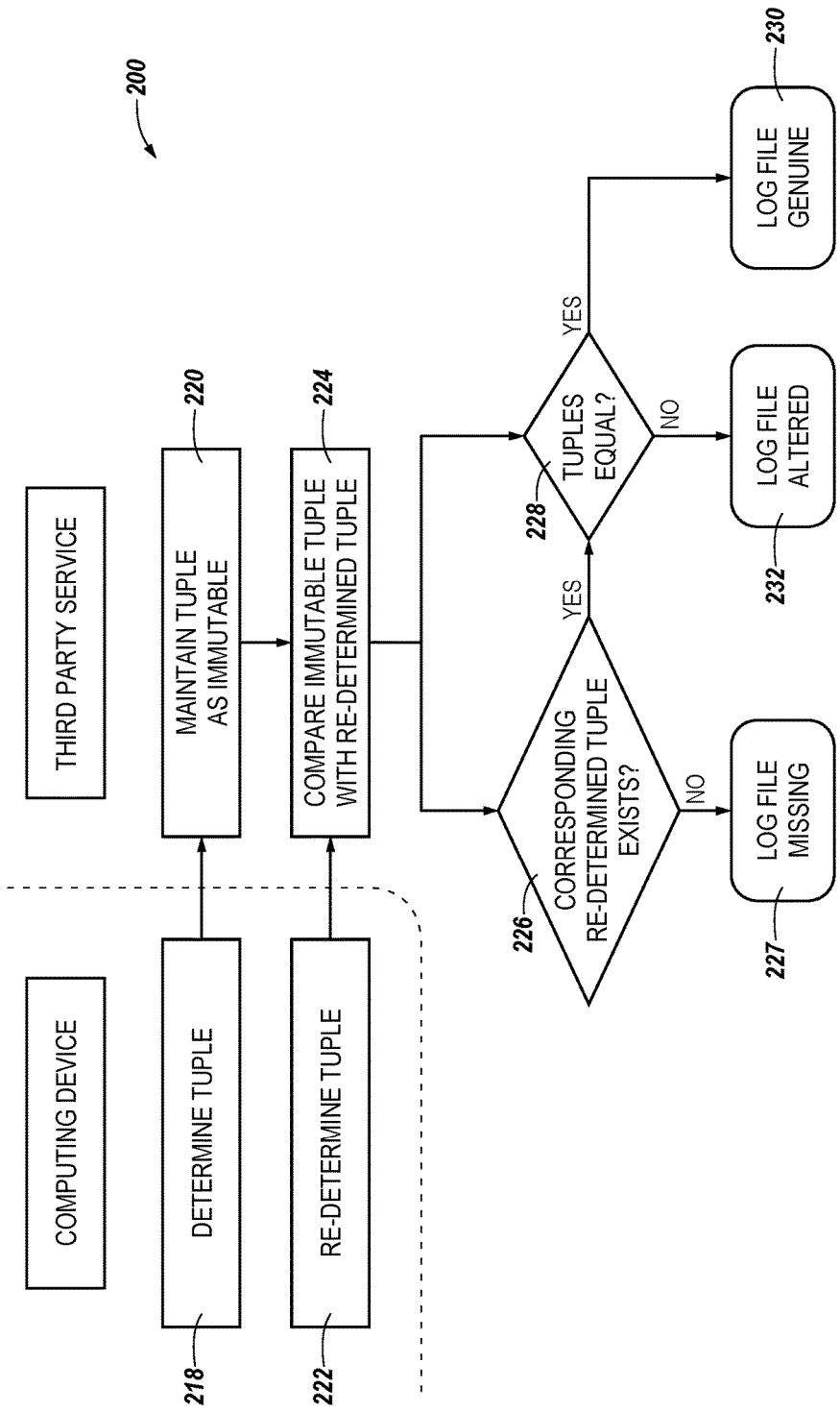
FIG. 2 is a diagram of a flow chart associated with immutable file storage according to the present disclosure.

FIG. 2 is a diagram of a flow chart associated with immutable file storage according to the present disclosure. For a portion of the following disclosure, alternating reference may be made to FIGS. 1 and 2.

The hash module 110 can include instructions to hash a log file received from the log source 120 to produce a hash value. The hash module 110 can, for instance, utilize a cryptographic hash function on the log file to produce the hash value. Embodiments herein do not limit the hashing and/or the production of a hash value to a particular method. Embodiments of the present disclosure can utilize a hashing algorithm that maps the log file to a bit string of a fixed size in a one-way function. Hashing the log file can allow benefits associated with a reduction in information to be stored, as well as an increase in resistance to malicious attacks.

The communication module 112 can include instructions to communicate a tuple including the hash value and information describing the log file to a third party service, wherein the third party service maintains the communicated tuple such that the communicated tuple is immutable. The information describing the log file may be referred to herein as "metadata" and can include, for instance, a time the log file was hashed, a file path associated with the log file, and a unique identifier of the log file. In some embodiments, a serial number of the log file may be included in the metadata. In some embodiments, the metadata can include a first portion of the log file (e.g., a first message of the log file), a time the first portion was received, a last portion of the log file (e.g., a last message of the log file), and a time the last portion was received. The hash value and the metadata may be collectively referred to as a "tuple" herein. The computing device 102 can digitally sign the tuple to enable integrity validation of the tuple and authentication of the party producing and/or sending the tuple. As shown in FIG. 2, the tuple can be determined at 218 in that the log file can be hashed and associated with the metadata.

The third party service 122 can associate each tuple with a time corresponding to its reception. The third party service 122 can digitally sign the tuple along with the reception time to enable integrity validation and authentication of the third party service 122. The third party service 122 can keep the communicated tuple unchanged, for instance. The third party service 122 can keep the communicated tuple in storage, not to be modified. As shown in FIG. 2 at 220, the third party service can maintain the tuple as immutable. In some embodiments, if a revision is sent to the third party service 122, the third party service 122 can keep both the original and the revision in immutable storage. The revision may include a second tuple with metadata similar to the original and possibly a different hash value. In some embodiments, for instance, the communication module 112 can communicate a revised hash value associated with a revision of the log file and the information to the third party service such that the communicated tuple and the communicated revised tuple are immutable. The communicated tuple may be herein referred to as an "immutable tuple."

Auditing a log file can begin with re-determining its tuple (e.g., as previously discussed in connection with FIG. 2 at 222). The subsequent communication module 114 can include instructions to communicate a re-determined tuple to the third party service, wherein the re-determined tuple includes a hash value produced by a subsequent hash of the log file and the information describing the log file (e.g., for auditing purposes). The communication of the re-determined tuple is shown as 222 in FIG. 2. In some embodiments, such auditing may be initiated by one or more devices other than the computing device 102. Access to the immutable tuple may be requested in cases where an attack is suspected, for instance. Access to the immutable tuple may be requested periodically as a matter of course, in some embodiments. In some embodiments, the audit may be accompanied by a nonce, which can accompany and/or be attached to a re-determined tuple (discussed below). For example, the third party service 122 can attach the nonce to a digitally signed response indicating whether the log file is deemed genuine. Such a technique may be used to mitigate replay attacks (e.g., replaying a tuple computed prior to the alteration of a log file). Because the third party service is effectively inaccessible by an attacker who may have access to the computing device 102 (e.g., an administrator of the computing device 102), any attempts to modify the log file can result in the determined tuple and the immutable tuple stored by the third party service 122 being different. Such a difference can indicate an attack. Accordingly, the subsequent communication module 114 can include instructions to re-determine the tuple by hashing the log file and accompanying it with its associated metadata, as previously discussed. The re-determined tuple can be communicated to the third party service 122. When multiple log files are being audited, the communication of the re-determined tuples may be made as a sequence and/or vector, for instance.

The reception module 116 can include instructions to receive a result of a comparison of the immutable tuple with the re-determined tuple. The third party service 122 can compare the re-determined tuple with the immutable tuple. As shown in FIG. 2 at 224, the comparison may generate one or more results. If the re-determined tuple is equal to the immutable tuple as shown at 228 of FIG. 2, then, at 230, the log file can be deemed genuine. If not, then the log files may be deemed to have been altered at 232. If a determination is made at 226 that the immutable tuple does not have a corresponding re-determined tuple, then the log file can be deemed to be missing at 227. If any of the corresponding tuples differ, then the respective file can be deemed to have been altered. Embodiments herein can provide a notification responsive to a determination that a log file is modified or is missing. The notification can be provided via a message sent to the computing device 102 and/or another device. The notification can be provided by a display of the computing device 102 and/or that of another device.

In some embodiments, the computing device 102 can send a hash periodically (e.g., once per minute). If no new log file was created or received from the log source 120 during a time period, a tuple representing an empty file can be produced (e.g., by the computing device 102 and/or the third party service 122) and be subsequently stored by the third party service 122. Thus, the lack of a periodic hash may be indicative of an attack. Accordingly, the communication module 114 can include instructions to re-communicate the hash value to the third party service 122 a particular period of time following the communication of the hash value to the third party service 122. In some embodiments, the metadata of a tuple can indicate that there were no changes made to the log file by the computing device 102.

Figure 3:
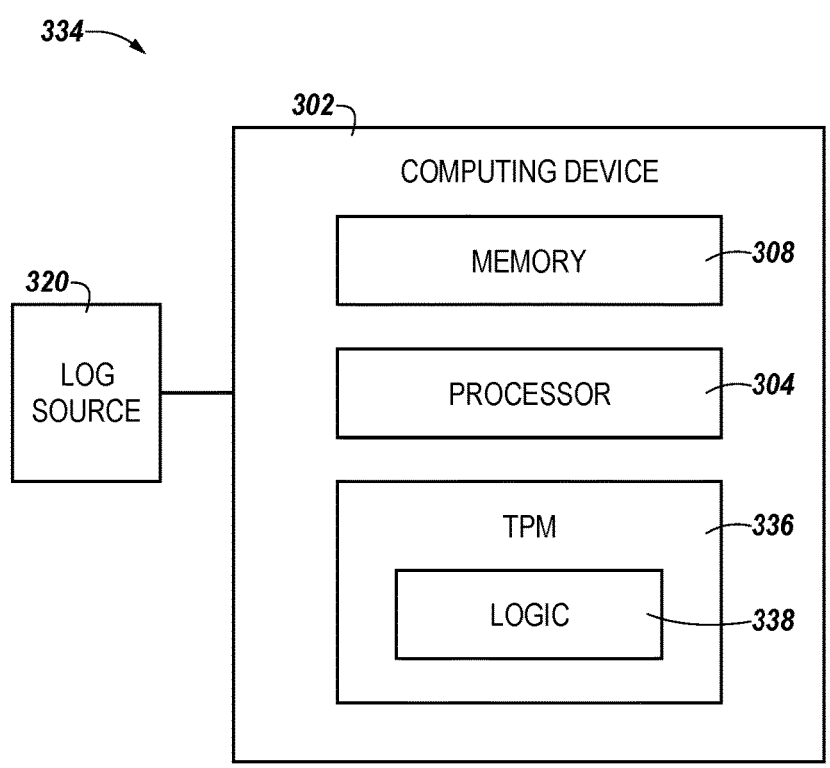
FIG. 3 is a diagram of another system for immutable file storage according to the present disclosure.

FIG. 3 is a diagram of another system 334 for immutable file storage according to the present disclosure. The system 334 can include a computing device 302 and a log source 320. In some embodiments, the computing device 302 can be analogous to the computing device 102 previously described in connection with FIG. 1. In some embodiments, the log source 320 can be analogous to the log source 120 previously described in connection with FIG. 1. As shown in FIG. 3, the computing device 302 can include a processor 304 and a memory 308, which can be respectively analogous to the processing resources 104 and the memory resources 108 previously described in connection with FIG. 1.

The computing device 302 can include a TPM 336. It is noted that while the TPM 336 is shown as being installed in (e.g., embedded in) the computing device 302, embodiments of the present disclosure are not so limited. For instance, the TPM 336 can be installed in another computing device and accessible by the computing device 302 (e.g., via a network connection).

Additionally, it is noted that while a "TPM" 336 having logic 338 is shown in FIG. 2, other devices can be utilized in accordance with the present disclosure to provide immutable file storage. For instance, embodiments can utilize a smart chip and/or smartcard to provide immutable file storage. That is, where the specific example of "TPM" is discussed herein, it is to be understood that other devices providing secure, immutable encryption can be used.

The TPM 336 is a dedicated controller (e.g., microcontroller). The TPM 336 can be a peripheral device on a motherboard of the computing device 302 in some embodiments. The TPM 336 can include logic 338 to encrypt tuples with a private key that is inaccessible to users (e.g., administrators, attackers, etc.). A corresponding public key can be signed by a trusted authority, for instance. In some embodiments, the TPM 336 can use the X.509 standard of public key infrastructure to manage digital certificates. TPMs can be used to measure and/or attest to the trustworthiness of a computing platform. TPMs can measure and/or attest to the integrity of a boot sequence. TPMs can measure and/or attest to the authenticity of code being run on a device (e.g., operating system (OS) and/or application stack). This, for instance, can allow a remote user to audit the integrity of a remote server or ensure that only a trustworthy OS may open (e.g., "unseal") an encrypted file.

Embodiments of the present disclosure can utilize the TPM 336 to ensure the integrity of files and/or logs on the computing device 302. The TPM 336 can digitally sign and/or encrypt the tuples described herein. Additionally, the TPM 336 can accumulate data in its platform configuration registers (PCRs). This storage can allow the tracking of a sequence of log file hashes and/or tuples including the hashes, such that an integrity audit can be performed later. Accordingly, in a manner analogous to the process described above in connection with FIG. 1, the computing device can receive log files from the log source 320 and hash each log file to produce a respective hash value associated with each log file.

The TPM 336 can fulfill a role similar to that of the third party service 122 described above to provide capability analogous to the immutable file storage. The computing device 302 can compute hash values for each log file and can immutably store the hash into a PCR of the TPM 336. Some embodiments may include immutably storing tuples comprised of the hash values and associated metadata. If the hash or tuple (which includes the hash) are too wide to be stored in the PCR of the TPM 336, then salting and hashing techniques can be used to compact the hash or tuple such that it fits into the PCR. A single PCR can be used to store immutably a sequence of hash values because every store operation can combine the past PCR value with the newly added/stored value using another hash operation. In some embodiments, a cryptographic hash can be utilized, such as Secure Hash Algorithm 1 (SHA-1), for instance.

When auditing the integrity of the log files on the computing device 302, the auditor can simulate the expected value in the PCR by hashing the log files and combining them using the same procedure used when storing values into the PCR, described above. Then, the auditor can request the TPM to quote the current value of the PCR. If the values are identical then the log files on the computing device 302 can be deemed genuine, otherwise they can be deemed to have been tampered with. In some embodiments the auditing can be orchestrated on the device 302 in order to mitigate attacks and/or ensure isolation of the computing device 302. In some embodiments the auditing can be orchestrated on another device. In embodiments in which the auditing is orchestrated on another device, an audit request can include a nonce provided to the computing device 302 and the TPM 336 to factor into the response by the computing device 302 and the TPM 336 by the TPM 336 digitally signing the response including the PCR value and nonce, for instance. The comparison of the determined tuple and/or hash values can be carried out in a manner analogous to that discussed in connection with FIG. 1, for instance.

The TPM 336 can provide this functionality securely, for instance, because it is, by design, not openly accessible to a user. The interface of the TPM 336 can allow storing values, but may not allow deletion, in some cases. In other cases, the interface of the TPM 336 may allow deletion but such deletion may be traceable such that tampering would be deemed to have occurred. While a user may have physical access to the TPM 336, the user cannot easily alter the TPM 336 because it is a microcontroller, as opposed to other storage that can be more easily altered with software and/or hardware. That is, the user would have to "rewire" the TPM 336 in a cleanroom environment to have a reasonable chance of altering it. The TPM 336 is also inaccessible in the sense that its private key encryption means that the user cannot decrypt data stored on the TPM 336 because the user does not have access to the private key. In some embodiments the computing device 302 can be located in a datacenter such that it is remote with respect to any user, thereby rendering physical attack unlikely.

In some embodiments, neither the log source 320 nor the computing device 302 is connected to another computing device. Accordingly, immutability of files can be provided in the absence of any network connection (or access to the Internet, for instance). In some embodiments, the log source 320 can be an application executed by the computing device 302.

As another layer of security, in some embodiments, the computing device 302 can be configured to index the encrypted tuples and store the index. The index (e.g., a copy of the index) can be communicated back to the TPM 336. In some embodiments the index can be hashed and communicated back to the TPM 336. The logic 338 of the TPM can include logic to encrypt the communicated index or the communicated hashed index and store the encrypted communicated index or communicated hashed index. Any modification of the index stored by the computing device 302 may be apparent based on comparison of the index with the encrypted communicated index stored by the TPM 336, for instance, or their respective hash values. As with revisions discussed above, a revised index (e.g., following the addition of log file(s)) can be sent to the TPM 336 where it can be encrypted and stored along with the already-encrypted and stored index. In some embodiments, a revision of a log file can be tracked using a second PCR. In some embodiments, both the original and the revised log files can be stored on the device 302. The hash of the revised log file can be stored into the PCR (e.g., on top of the previous hash values).

Figure 4:
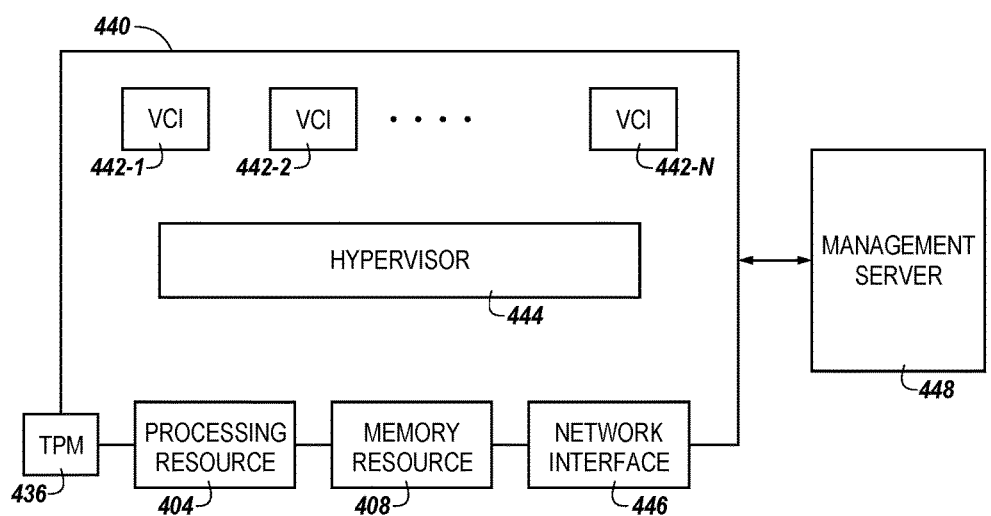
FIG. 4 is a diagram of a host for immutable file storage according to the present disclosure.

FIG. 4 is a diagram of a host for immutable file storage according to the present disclosure. It is noted that embodiments of the present disclosure are not limited to the host 440 illustrated in FIG. 4; as previously discussed, immutable file storage can be provided in other environments. The host 440 can include processing resources 404 (e.g., a number of processors), memory resources 408, and/or a network interface 446. Memory resources 408 can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. For example, the memory resources 408 may comprise primary and/or secondary storage.

The host 440 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

As previously discussed, a log source, as referred to herein, can be a virtual computing instance (VCI) in some embodiments, which covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a software defined data center. In such a system, information can be propagated from an end user to at least one of the VCIs in the system, between VCIs in the system, and/or between at least one of the VCIs in the system and a management server. In some embodiments, the management server can be provided as a VCI. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources. Some resources may be physical (and not virtual) components, such as a trusted platform module (TPM), discussed further below.

The host 440 can incorporate a hypervisor 444 that can execute a number of VCIs 442-1, 442-2, . . . , 442-N that can, in some embodiments, each provide the functionality of a log source, as previously discussed. The VCIs 442-1, 442-2, . . . , 442-N are referred to generally herein as "VCIs 442." The VCIs 442 can be provisioned with processing resources 404 and/or memory resources 408 and can communicate via the network interface 446. The processing resources 404 and the memory resources 408 provisioned to the VCIs 442 can be local and/or remote to the host 440. For example, in a software defined data center, the VCIs 442 can be provisioned with resources that are generally available to the software defined data center and are not tied to any particular hardware device. By way of example, the memory resources 408 can include volatile and/or non-volatile memory available to the VCIs 442. The VCIs 442 can be moved to different hosts (not specifically illustrated), such that different hypervisors manage the VCIs 442. In some embodiments, a VCI among the number of VCIs 442 can be a master VCI. For example, VCI 442-1 can be a master VCI, and VCIs 442-2, . . . , 442-N can be slave VCIs. The host 440 can be in communication with a management server 448.

In some embodiments, the management server 448 can be configured to receive log files from each of the VCIs 442. In some embodiments, the VCIs 442 can report the log files to the management server 448 in real time and/or in response to a request. As previously discussed, the management server can be analogous to the computing device 102, previously described in connection with FIG. 1. In some embodiments, the management server 448 can include a combination of software and hardware, or the management server 448 can include software and can be provisioned by the processing resource 404.

Each of the VCIs 442 can hash a respective log file to produce a respective hash value. In some embodiments, a log file may be created by the VCI that hashes it. In some embodiments, a VCI may hash a log file that was not created by that VCI.

The TPM 436 illustrated in FIG. 4 can be analogous to the TPM 336, previously described in connection with FIG. 3. The host 440 can provision each of the VCIs 442 with a path to a secure cryptoprocessor (illustrated as TPM 436 in FIG. 4) on the host 440 to use the secure cryptoprocessor to store (or accumulate into a corresponding TPM PCR) the respective hash values. In some embodiments the TPM 436 is physical, in which case each of the VCIs 442 can be provisioned with a pathway enabling it to interact with the TPM 436 and its corresponding PCR (of the plurality of PCRS of the TPM 436). In some embodiments, there may be multiple TPM modules attached to the host 440 to enable a larger number of VCIs, for instance. Some embodiments may provision the VCIs with remote TPM modules accessible via one or more buses and/or the network. In some embodiments the TPM module may be virtualized such that each of the VCIs 442 has its own virtualized TPM corresponding to TPM 336 discussed in FIG. 3. As discussed above, the hash values, or the hash values in combination with metadata (e.g., tuples) may be inserted into (or accumulated by) a PCR of the TPM 436.

Methods of providing immutable file storage in accordance with embodiments herein can be carried out by a computing device, for instance, in combination with one or more hardware devices. Executable instructions and/or logic defining such methods can include hashing a log file received from a log source to produce a hash value, and communicating a tuple including the hash value and information describing the log file to a trusted independent entity. In some embodiments, the role of the trusted independent entity can be fulfilled by a third party service. In some embodiments, the role of the trusted independent entity can be fulfilled by one or more hardware devices, such as a TPM, smart chip, and/or smart card, for instance. The trusted independent entity can maintain the communicated tuple such that the communicated tuple is immutable. Methods can include re-determining and/or communicating a re-determined tuple to the trusted independent entity. Methods can include receiving a result of a comparison between the immutable tuple and the re-determined tuple. A difference between the re-determined tuple and the immutable tuple can indicate the actions of an attacker, for instance.

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

I claim:

1. A non-transitory machine-readable medium storing instructions which, when executed by a processor, cause the processor to:
    hash a log file received from a log source to produce a hash value;
    communicate a tuple including the hash value and information describing the log file to a third party service, wherein the information describing the log file includes a first message of the log file, a time the first message was received, a last message of the log file, and a time the last message was received, and wherein the third party service maintains the communicated tuple such that the communicated tuple is immutable;
    communicate a re-determined tuple to the third party service, wherein the re-determined tuple; includes a hash value produced by a subsequent hash of the log file and the information describing the log file;
    receive a result of a comparison of the immutable tuple with the re-determined
    encrypt each of the hash values and the information; and
    store the encrypted hash values and information:
    wherein said processor is further configured to:
    index the encrypted hash values and the information; and
    communicate the index to a trusted platform module (TPM), having logic to:
    encrypt the communicated index;
    store the encrypted communicated index;
    receive a revised index;
    encrypt the revised index; and
    store the encrypted revised index.

2. The medium of claim 1, wherein the third party service is in a different security domain than the medium when the instructions thereon are executed.

3. The medium of claim 1, wherein the information describing the log file includes:
    a time the log file was hashed;
    a file path associated with the log file;
    and a unique identifier of the log file.

4. The medium of claim 1, wherein the instructions include instructions to:
    communicate a revised tuple to the third party service, wherein the third party service maintains the revised tuple such that the revised tuple is immutable.

5. The medium of claim 1, wherein the result of the comparison of the immutable tuple with the re-determined tuple includes a determination that the log file is modified.

6. The medium of claim 1, wherein the log source is a virtual computing instance.

7. The medium of claim 1, wherein the instructions include instructions to re-communicate the tuple to the third party service a particular period of time following the communication of the tuple to the third party service.

8. The medium of claim 1, wherein the third party service is a trusted directory service.

9. A system, comprising:
    a log source;
    a computing device, configured to:
      receive a plurality of log files from the log source;
      hash each log file to produce a respective hash value associated with each log file;
    a trusted platform module (TPM), having logic to:
    receive the hash values and respective information describing each log file from the computing device, wherein the information describing each log file includes a first message of the log file, a time the first message was received, a last message of the log file, and a time the last message was received;
      encrypt each of the hash values and the information;
      and store the encrypted hash values and information:
    wherein said computing device is configured to:
    index the encrypted hash values and the information; and
    communicate the index to the TPM; and
    the TPM has logic to:
      encrypt the communicated index;
      store the encrypted communicated index;
      receive a revised index;
      encrypt the revised index; and
      store the encrypted revised index.

10. The system of claim 9, wherein the TPM is installed on the computing device.

11. The system of claim 9, wherein the TPM is installed on an additional computing device.

12. The system of claim 9, wherein the each of log source and the computing device are not connected to an additional computing device.

13. The system of claim 9, wherein a private key associated with the TPM is inaccessible by a user of the computing device.

14. A system, comprising:
    a plurality of virtual computing instances (VCis);
    and a host executing the plurality of VCis,
    wherein:
      each of the plurality of VCis hashes a respective log file to produce a respective hash value; and
      the host provisions each of the plurality of VCis with a path to a secure cryptoprocessor on the host to use the secure cryptoprocessor to encrypt the respective hash values with information describing the respective log files, wherein the information describing the respective log files includes, for each log file, a first message of the log file, a time the first message was received, a last message of the log file, and a time the last message was received;

the secure cryptoprocessor configured to:
index encrypted hash values and the information; and
the secure cryptoprocessor has logic to:
encrypt the communicated index;
store the encrypted communicated index;
receive a revised index;
encrypt the revised index; and
store the encrypted revised index.

15. The system of claim 14, wherein the secure cryptoprocessor is a trusted platform module.

16. The system of claim 14, wherein the secure cryptoprocessor is a smart chip.

* * * * *